United States Patent [19]

Tanaka

[11] Patent Number: 5,402,115
[45] Date of Patent: Mar. 28, 1995

[54] STATE INFORMATION COMMUNICATIONS SYSTEM AND METHOD

[75] Inventor: Shotaro Tanaka, Katano, Japan

[73] Assignee: Matsuhita Electric Industrial Co., Ltd., Osaka, Japan

[21] Appl. No.: 989,051

[22] Filed: Dec. 9, 1992

[30] Foreign Application Priority Data

Dec. 9, 1991 [JP] Japan .................................. 3-324420

[51] Int. Cl.[6] ............................................ G05B 23/02
[52] U.S. Cl. .......................... 340/825.06; 340/825.22; 340/825.24; 340/825.25
[58] Field of Search ...................... 340/825.06, 825.08, 340/825.15, 825.24, 825.25, 825.22, 310 R, 825.07; 358/194.1, 86; 370/85.1, 85.2, 85.3; 348/734, 6, 8, 12

[56] References Cited

U.S. PATENT DOCUMENTS

| | | | |
|---|---|---|---|
| 4,418,333 | 11/1983 | Schwarzbach et al. | 340/825.07 |
| 4,755,792 | 7/1988 | Pezzolo et al. | 340/310 R |
| 4,855,730 | 8/1989 | Venners et al. | 340/825.24 |
| 5,008,662 | 4/1991 | Tokizane et al. | 340/825.06 |
| 5,132,679 | 7/1992 | Kubo et al. | 340/825.22 |

Primary Examiner—Donald J. Yusko
Assistant Examiner—Edwin C. Holloway, III
Attorney, Agent, or Firm—Ratner & Prestia

[57] ABSTRACT

A state information communications system includes a bus and first and second terminal units of TV set and VCR connected to the bus. The first terminal unit includes control command generator for generating a control command, an information request command generator for generating an information request command, a first communications control for sending the control command and the information request command to the bus, and for receiving information data directed to the first terminal unit. The second terminal unit includes a second communications control for receiving control command and the information request command from the bus, a terminal device having tape deck which operates in response to the control command, a state code generator for generating a fixed state code when the tape deck is in a fixed state and a transient state code when tape deck is in a transient state changing from one fixed state to another fixed state. The first terminal unit is informed, when the second terminal unit produces the transient state code in reply to the information request command, that the second terminal unit is in a transient state for carrying out a state change from a previous state to a state required by the control command.

7 Claims, 7 Drawing Sheets

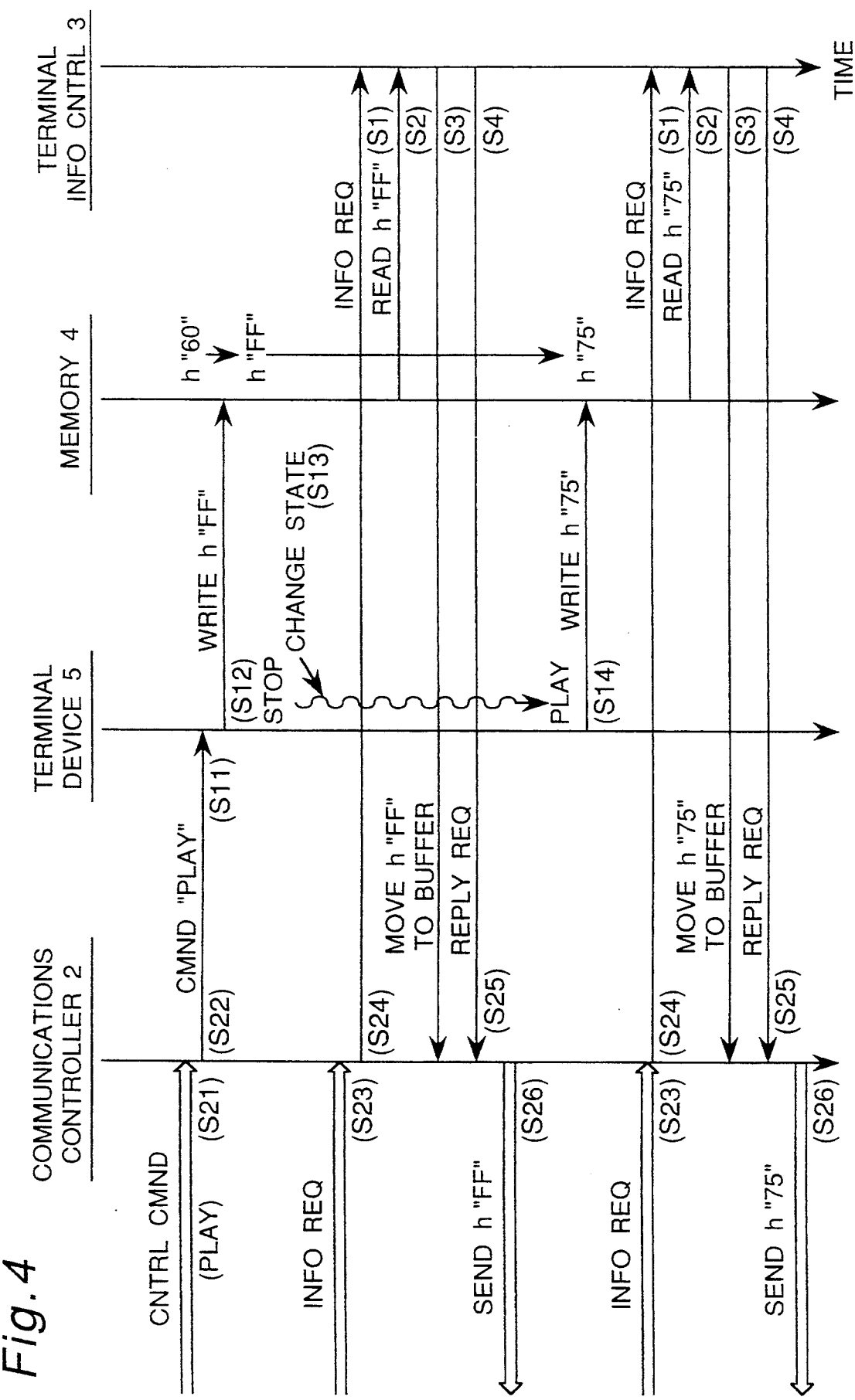

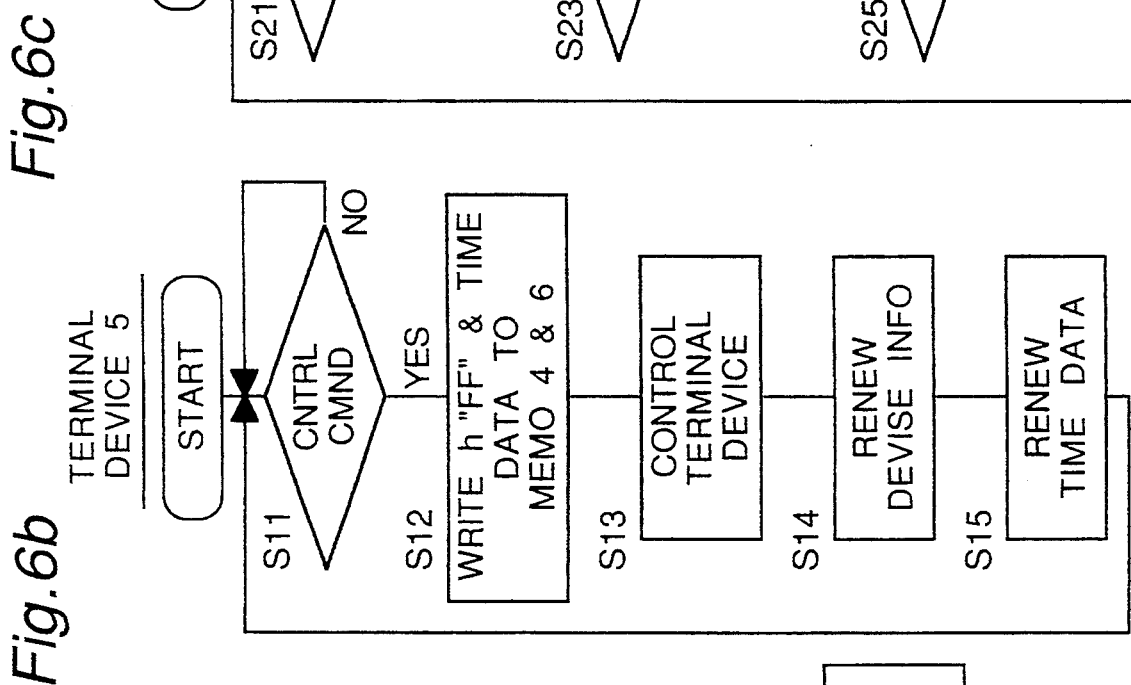
*Fig. 6c* *Fig. 6b* *Fig. 6a*
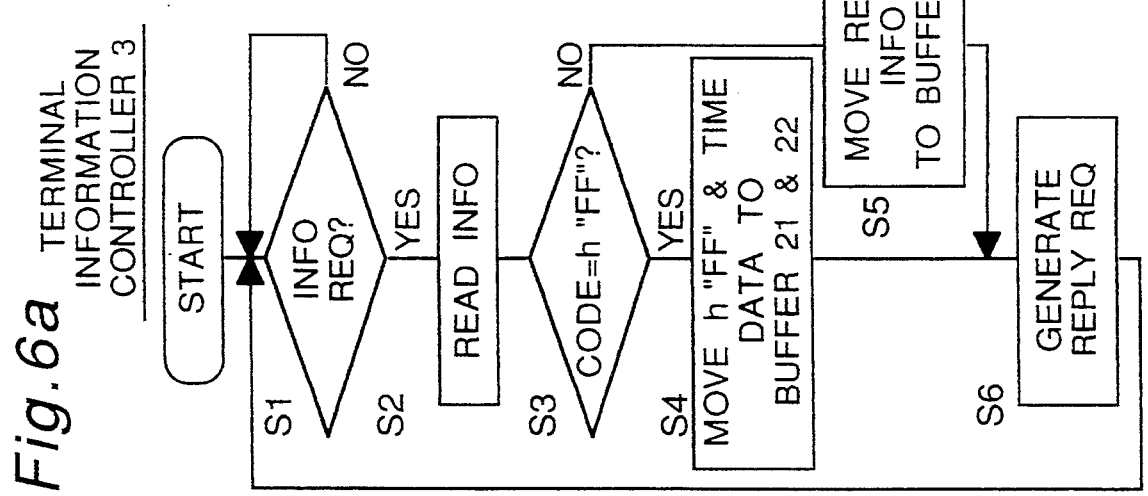

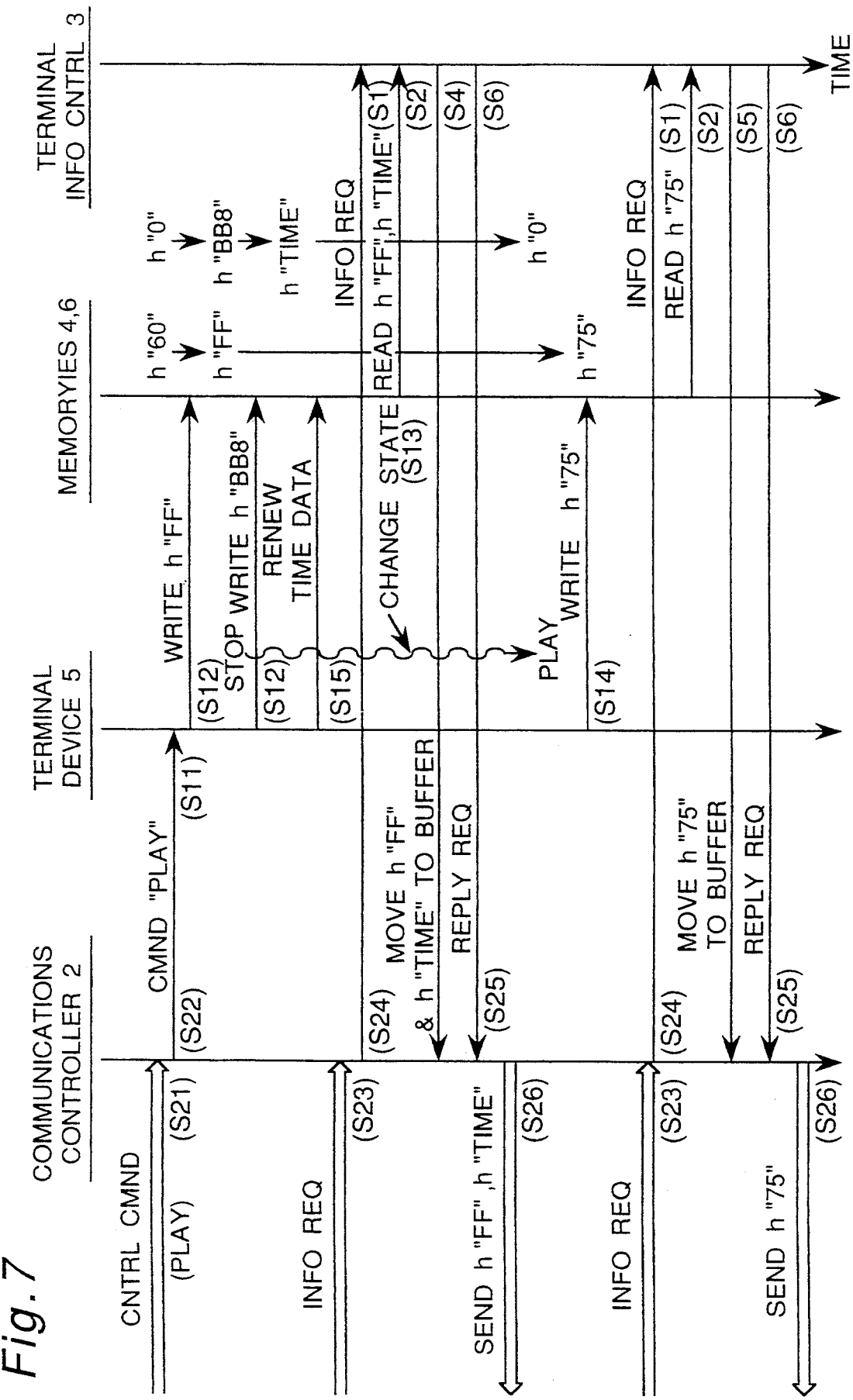

STATE INFORMATION COMMUNICATIONS SYSTEM AND METHOD

BACKGROUND OF THE INVENTION

1. Field of the Invention

The present invention relates to a state information communications system for sending the state information indicating the operating state of each device between interconnected terminal units linked via a communications bus, and also to a state information communications method.

2. Description of the Prior Art

A conventional state information communications system on a domestic digital bus (D2B) (IEC TC (84)-(S)861,2 Draft—Domestic Digital Bus (D2B)) used for data communications between, for example, audio and video equipment is shown in FIG. 1.

Each terminal unit, such as 7, comprises a communications controller 2a, terminal device 5a, and device information memory 4a. The terminal unit 7 is, for example, a VCR and the terminal unit 8 is, for example, a television receiver. The terminal device 5a includes a tape deck, a tape loading mechanism, a tuner, etc. When a terminal unit 7 is polled for its state information by another terminal unit 8 on the network, the communications controller 2a fetches the requested state information from the device buffer 21a in the communications controller 2a and replies by sending the information over the communications line. The state information stored in the device buffer 21a is supplied from the device information memory 4a which is continuously updated in real-time as the actual terminal state of the terminal device 5a changes, for example, from stop state to play state.

With this method, however, when the play command is provided to terminal unit 7 from terminal unit 8, and thereafter terminal unit 7 is polled for its state information by another terminal unit 8, terminal unit 7 replies that its state is STOP until the terminal device 5a is completely changed to the PLAY state. Thus, during a state change operation, terminal unit 8 frequently (such as after every 400 ms) requests terminal unit 7 to produce the state information, and terminal unit 7 produces STOP state information as many time as the number of requests produced from the terminal unit 8, resulting in increase of the network traffic through the bus line 1.

Furthermore, during the state change terminal unit 8 is not informed whether the state in terminal unit 7 is really changing or it is not operating because of some defect, such as machine failure, or tape not being loaded.

SUMMARY OF THE INVENTION

Therefore, an object of the present invention is to provide an improved state information communications system and a method in which the terminal unit that has produced the control command is informed of the transient state of the device in the terminal unit that has received the control command.

Further object of the present invention is to provide an improved state information communications system and method in which the terminal unit that has produced the control command prolongs the cycle time to produce the information request if the transient state code is received.

To achieve this object, a terminal unit according to the present invention comprises a communications controller controlling communications over the communications bus; a device information memory for storing the terminal state information; a terminal information controller for controlling the device information memory; and a terminal device for exchanging information with other terminal units via the communications controller and communications lines, and for updating the device information stored in the device information memory.

When a terminal information request is received from another device via the communications bus, the terminal information controller fetches the appropriate state information from the device information memory, and replies to the terminal unit requesting the information through the communications controller and the communications bus. When the device state is being changed and is therefore indeterminate, transient state information is returned as the fetched state information. When the terminal device is executing a terminal control command received from the communications bus and communications controller and the device state changes as a result of command execution, the device state information stored in the device information memory is immediately updated by the terminal device.

An alternative means of achieving the objects of the invention is a terminal unit comprising a communications controller controlling communications over the communications bus; a response time memory for storing the response time information indicating the time required for the state information to be determined when the state information and the contents of the device information memory, which stores the state information of the terminal device, are being changed; a terminal information controller for controlling the device information memory; and a terminal device for exchanging information with other terminal units via the communications controller and communications lines, and for updating the device information stored in the device information memory.

When a terminal information request is received from another device via the communications bus with this embodiment, the terminal information controller fetches the appropriate state information from the device information memory, and replies to the terminal unit requesting the information through the communications controller and the communications bus. When the device state is being changed and is therefore indeterminate, the transient state information is returned as the fetched state information together with the appropriate response time information fetched from the response time memory, which stores the response time at which the state is expected to be determined. When the terminal device is executing a terminal control command received from the communications bus and communications controller and the device state and response time change as a result of command execution, the device state information stored in the device information memory and the response time information stored in the response time memory are immediately updated by the terminal device.

As a result, the method and apparatus of the present invention improve the transmission efficiency of the communications bus and thus enable efficient reading of terminal unit information when reading the state information of any polled device on the network from the device information memory of the polled device in response to a device state information request by sending a device state reply indicating that the state of the polled device is currently being changed, and by accompanying this reply with the timing information for the next device state information request.

BRIEF DESCRIPTION OF THE DRAWINGS

The present invention will become more fully understood from the detailed description given below and the accompanying diagrams wherein:

FIG. 4 is a time chart showing the communications sequence according to the first embodiment of the present invention;

FIGS. 6a, 6b and 6c are flow charts showing operations carried out in the system shown in FIG. 5; and FIG. 7 is a time chart showing the communications sequence according to the first embodiment of the present invention.

DESCRIPTION OF PREFERRED EMBODIMENTS

Figure 1:
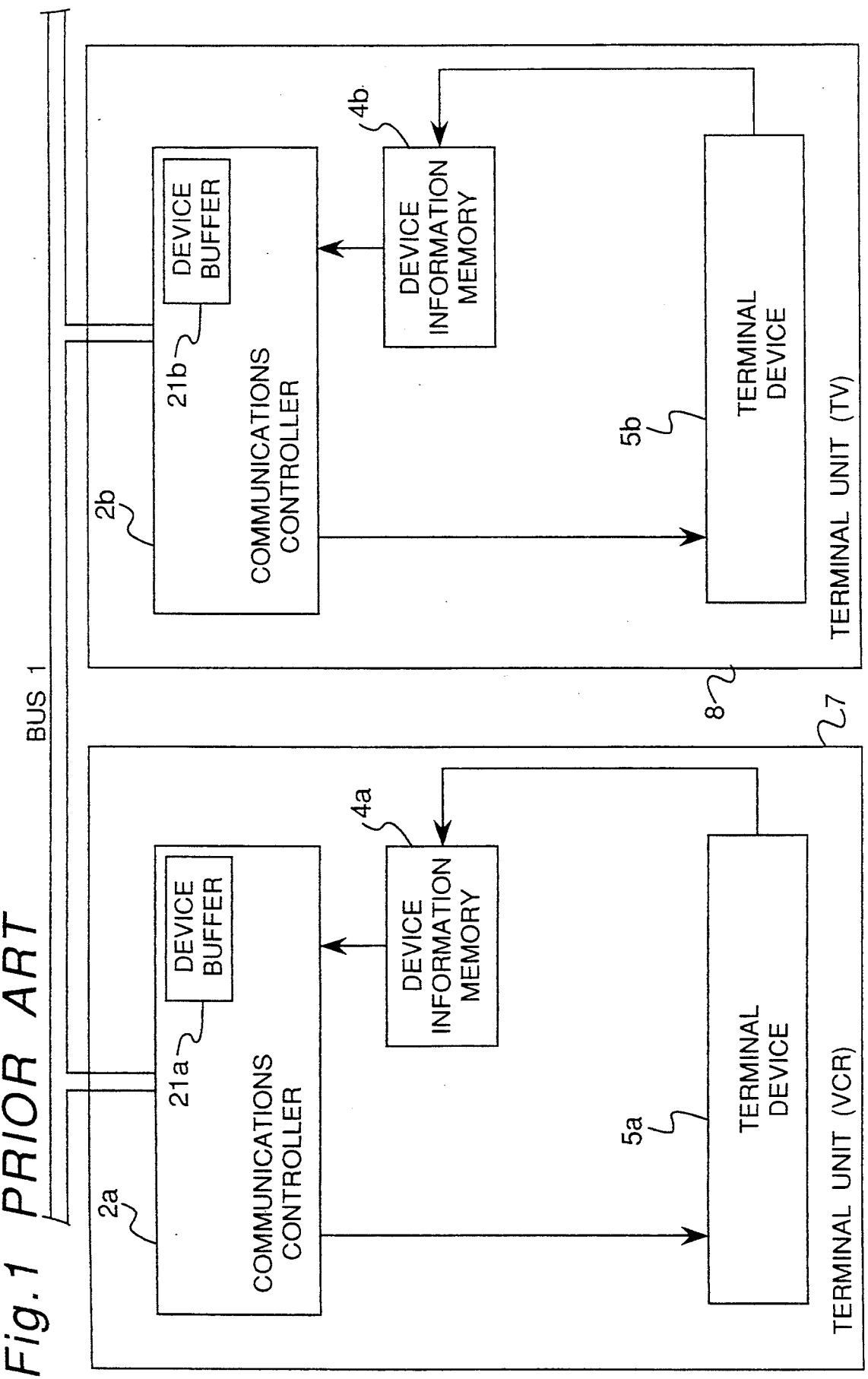
FIG. 1 is a block diagram of the state information communications system according to the prior art.

Referring to FIG. 1, a first embodiment of the state information communications system according to the present invention is shown. Terminal units 7 and 8 are connected by a communications bus 1. It is to be noted that more than two terminal units may be connected to a single communications bus 1.

Terminal unit 7 comprises a communications controller 2a, terminal information controller 3a, a device information memory 4a, and terminal device 5a. Terminal unit 8 has the same structure as that of terminal unit 7, and the elements in the terminal unit 8 are indicated by reference numbers with a suffix "b", instead of "a".

Furthermore, according to the present invention, terminal device 5a has a state code generator 50a which produces a transient code h"FF" indicating that the mechanism in question is in the transient state, that is an intermediate state between two fixed states, such as between the STOP state and the PLAY state. The state code generator 50a also produces codes representing the fixed states, such as a code h"60" indicating the stop state, h"75" indicating the play state, and so on. Also, the terminal device 5a has an information request generator 51a for generating information request codes after every waiting time Tw, which is prolonged in response to the receipt of the transient code h"FF", as will be described later. The information request code is a code generated from one terminal unit, e.g., 8 and sent to another terminal unit, e.g., 7 for reading an information code stored in a particular area in the memory 4a of said another terminal unit and sending it to said one terminal unit. Thus, the information request code accompanies addresses (or information) of the sending and receiving terminal units, and an address in the device information memory 4a at which the requested information is stored.

Figure 2:
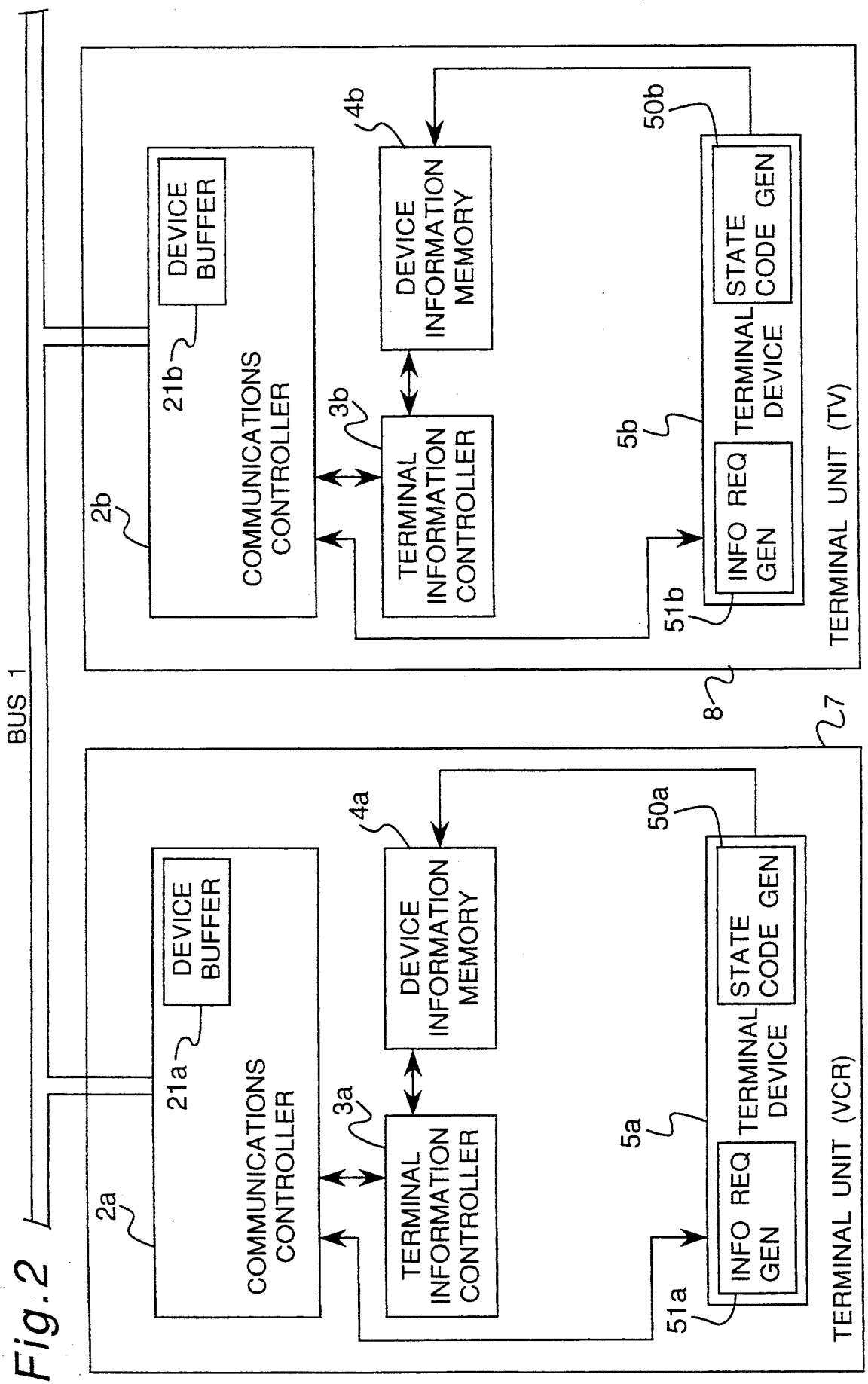
FIG. 2 is a block diagram of a state information communications system according to a first embodiment of the present invention.

In the example shown in FIG. 2, it is assumed that terminal unit 7 is a VCR and terminal unit 8 is a television receiver. Thus the terminal device 5a includes a tape deck, a tape loading mechanism, a tuner, etc which are necessary for the VCR, and terminal device 5b includes sound volume, tuner, frequency band selector, hue adjuster, tint adjuster, etc which are necessary for the television receiver. Also, in the terminal device 5b, a switch panel having switches for changing the operation of the television receiver and the switches for controlling the VCR is included.

In operation, it is assumed that terminal unit 7 which is the VCR is now in the STOP state, and that terminal unit 8 which is the television receiver has produced a control command of PLAY to terminal unit 7. Such a command is produced from the terminal device 5b by the manual operation of the switch panel or by a timer setting. The PLAY control command from the terminal device 5b is outputted to bus 1 through communications controller 2b and supplied to communications controller 2a and further to the terminal device 5a and also to terminal information controller 3a.

In response to the receipt of the PLAY control command, the terminal information controller 3a permits access to a particular area (at address 20C4 as will be described later) in memory 4a where the information data PLAY should be stored. Also, in response to the receipt of the PLAY control command, terminal device 5a operates the tape deck of the VCR, which has been in the STOP state, to change to the PLAY state. Also, the state code generator 50a produces a transient code h"FF" indicating that the tape deck is now changing its state from STOP to PLAY, and provides the code h"FF" to the device information memory 4a and is stored at the particular ares accessed by the terminal information controller 3a. In the code, h represents the hexadecimal numbering system and FF represents a maximum two digit number expressed by the hexadecimal numbering system.

The device information memory 4a stores the code h"FF" at the address 20C4 for storing data related to the winding state of the VCR. Table 1 given below shows the address and the data stored in the device information memory 4a.

TABLE 1

| | | | | | |
|---|---|---|---|---|---|
| General | 00 A0 h"60" | 00 A1 h"32" | 00 A2 h"27" | 00 A3 h"15" | 00 A4 h"90" |
| Deck state | Vacant | 20 C1 h"15" | 20 C2 h"00" | 20 C3 h"52" | 20 C4 h"FF" |
| Tuner state | Vacant | 28 C1 h"A1" | 28 C2 h"B2" | Vacant | Vacant |

The states in general are stored at addresses that start from 00, i.e., at addresses 00A0 to 00A4. Specifically, at 00A0, an information code relative to the power, such as a code indicating ON, OFF or stand-by is stored. Currently, h"60" indicating the power ON is stored. At 00A1, an information code relative to the command source, such as a code indicating a remote controller, a panel controller or a computer, is stored. Currently, h"32" indicating that the command source is the remote controller is stored. Similarly, other general information code codes are stored at addresses which start from 00.

The states of the deck are stored at addresses that start from 20, i.e., at addresses 20C1 to 20C4. Specifically, at 20C1, an information code relative to the tape, such as a code indicating loading or unloading of the tape is stored. Currently, h"15" indicating that the tape is loaded is stored. At 20C2, an information code relative to the recording, such as a code indicating normal speed recording, X3 speed recording, pause or stop is stored. Currently, h"00" indicating that the recording is not carried out is stored. At 20C3, an information code relative to the reproduced condition, such as a code indicating normal speed play, slow speed play, still picture play is stored. Currently, h"52" indicating the normal speed play is stored. At 20C4, an information code relative to winding condition, such as a code indicating play, fast forward, fast rewind or stop is stored. Currently, a transient code h"FF" indicating that the state is in the mid of two fixed states of play and stop is stored.

The states of the tuner are stored at addresses that start from 28, i.e., at addresses 28C1 to 28C2. Specifically, at 28C1, an information code relative to the channel, such as channel 1, channel 2, etc. is stored. Currently, h"A1" indicating channel 16 is stored. At 28C2, an information code relative to the band, such as UHF (ultra high frequency) band or VHF (very high frequency) band is stored. Currently, h"B2" indicating the VHF band is stored. Other addresses can be used for storing other information codes.

The codes stored in device information memory 4a are supplied from the terminal device 5a, and are renewed in real time as the devices, such as a tuner and a deck, change their state.

Then, after the lapse of a waiting time Tw (e.g., 400 ms) from the generation of the PLAY control command, the information request generator 51b in terminal device 5b produces an information request code designating an addressing 20C4 in the VCR terminal unit 7. The information request code is transmitted through the communications controller 2b and bus 1 to communications controller 2a and further to terminal information controller 3a. In response to the received information request code, controller 3a fetches a code stored at address 20C4 in memory 4a. Currently, a transient code h"FF" indicating the transient state is stored at address 20C4. The fetched code h"FF" from address 20C4 is transmitted to the device buffer 21a in the communications controller 2a.

Then, the communications controller 2a sends out the transient code h"FF" in the device buffer 21a through bus 1 to communications controller 2b and further to the terminal device 5b. In the terminal device 5b, the information request generator 51b doubles, in response to the received transient code h"FF", the waiting time Tw for generating the next information request code, so that the next information request code will be produced after 2 Tw (e.g., 800 ms) from the previous information request code.

If the terminal device 5b receives the transient code for the second time, the waiting time is again prolonged, such as doubled to 4 Tw (e.g., 1600 ms).

In this manner, the data traffic in the bus 1 can be reduced.

Figure 3C:
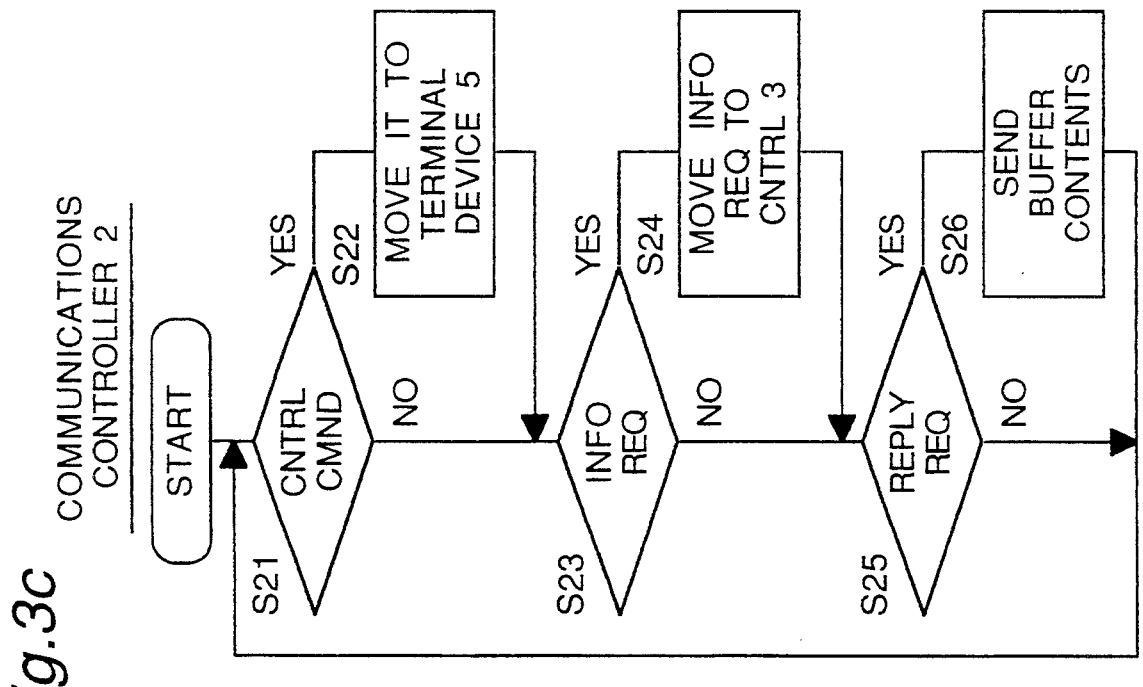
FIGS. 3a, 3b and 3c are flow charts showing operations carried out in the system shown in FIG. 2.
Figure 3B:
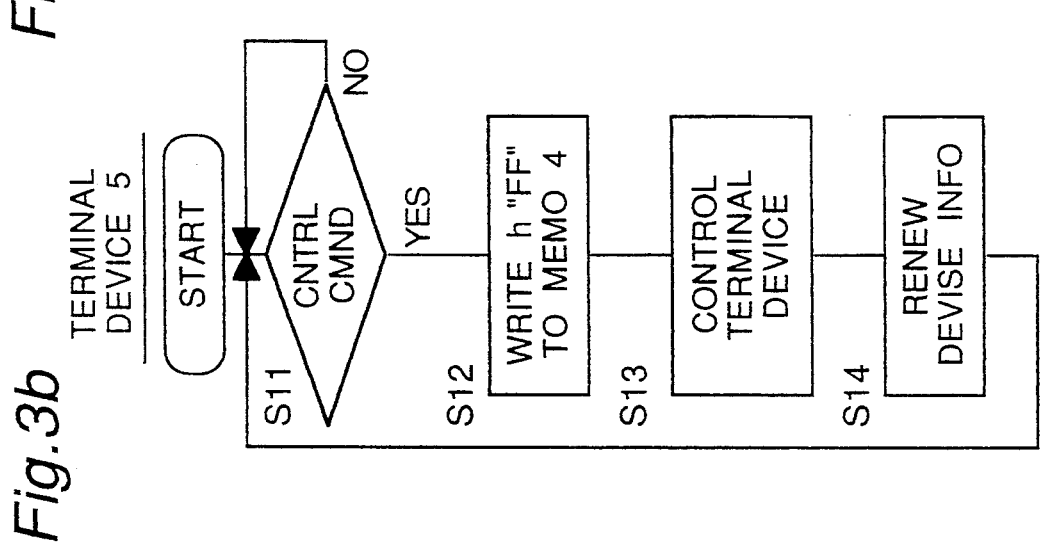
Figure 3A:
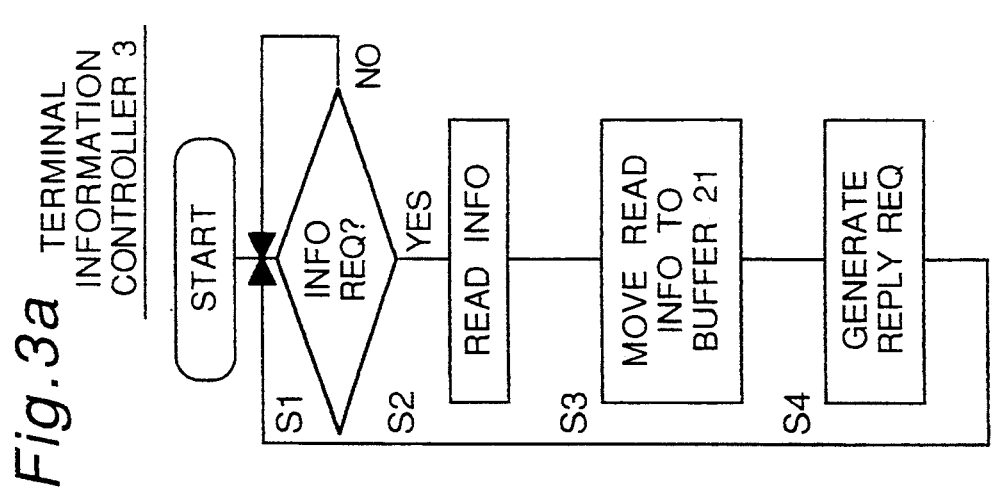

FIGS. 3a, 3b and 3c show flow charts of operations in the terminal information controller 3 (3 is a general indication of 3a and 3b. The same applied to the other.), terminal device 5 and communications controller 2, respectively. FIG. 4 shows a timing chart of the elements 2, 3, 4 and 5.

Referring to FIGS. 3c and 4, the above described operation is further explained particularly with respect to the communications controller 2a in the VCR terminal unit 7.

In FIG. 4, long vertical arrows represent time axes, the bold horizontal arrows which are on the left side of the communications controller 2 represent data transmission along bus 1, and the thin horizontal arrows extending between the time axes indicate data transmission within each terminal unit. Also, short vertical arrows represent periods during which the code is carried in memory 4, and a wavelike vertical arrow represents a period in which the device, such as tape deck, is changing its state e.g., from STOP state to PLAY state. The number given in parentheses corresponds to the step number shown in FIGS. 3a, 3b and 3c.

At step S21, when communications controller 2a receives PLAY control command from the communications controller 2b in the TV terminal unit 8, it moves the PLAY control command to terminal device 5 (step S22).

At step S23, when communications controller 2a receives an information request code from TV terminal unit 8, it moves the information request code to terminal information control 3 (step S24).

At step S25, when communications controller 2a receives a reply request code from terminal information controller 3a requesting communications controller 2a to send out data stored in buffer 21a to bus 1, communications controller 2a carries out the request by sending the data stored in buffer 21a to bus 1 (step S26).

Referring to FIGS. 3b and 4, the above described operation is further explained particularly with respect to the terminal device 5a in the VCR terminal unit 7.

At step S11, when the terminal device 5a receives the PLAY control command from the communications controller 2a, first the state code generator 50a is activated to write transient code h"FF" in a particular area (20C4) in the device information memory 4a (step S12). Thus, in memory 4a, the data stored at address 20C4 is changed from h"60" representing the STOP state to h"FF" representing the transient state.

At step S13, terminal device 5a controls the terminal device, which is in this case the tape deck, to carry out the operation requested by the control command.

At step S14, when the tape deck is completely changed to the PLAY state, the state code generator 50a in the terminal device 5a produces a code h"75" indicating the PLAY state. The produced code h"75" is overwritten at address 20C4 to renew the information data from h"FF" to h"75".

Referring to FIGS. 3a and 4, the above described operation is further explained particularly with respect to the terminal information controller 3a in the VCR terminal unit 7.

At step S1, when the terminal information controller 3a receives the information request code from communications controller 2a, it takes an access to a particular area in memory 4a based on the address (in this case address 20C4) carried in the information request code, and reads the information data stored in the accessed area (step S2).

Then, at step S3, the read information data, which may be a transient code h"FF" or some other code specifying an established state, such as a PLAY state, is moved and temporarily stored in the device buffer 21a.

Then, at step S4, the terminal information controller 3a generates a reply request code to the communications controller 2a. Thus, the communications controller 2a sends out along bus 1 the data stored in buffer 21a so as to reply to the terminal unit 8 that has produced the information request.

If the reply data send back to the terminal unit 8 is the transient code h"FF", the information request generator 51b in terminal unit 8 doubles the waiting time Tw for generating the next information request code, so that the next information request code will be produced after 2 Tw (e.g., 800 ms) from the previous information request code.

Thus, according to the present invention, the network traffic through the bus line 1 can be reduced. Also, since the polling terminal unit 8 is informed of the transient state being taken over in another terminal unit 7, the control in the polling terminal unit 8 can be carried out smoothly with less burden to produce the information request code.

In the above example, terminal unit 8 is explained as the polling terminal unit that sends the information request code to the addressed terminal unit 7 via the communications bus 1, but it is possible to use the terminal unit 7 as the polling terminal unit that sends the information request code to another terminal unit, such as 7.

Figure 5:
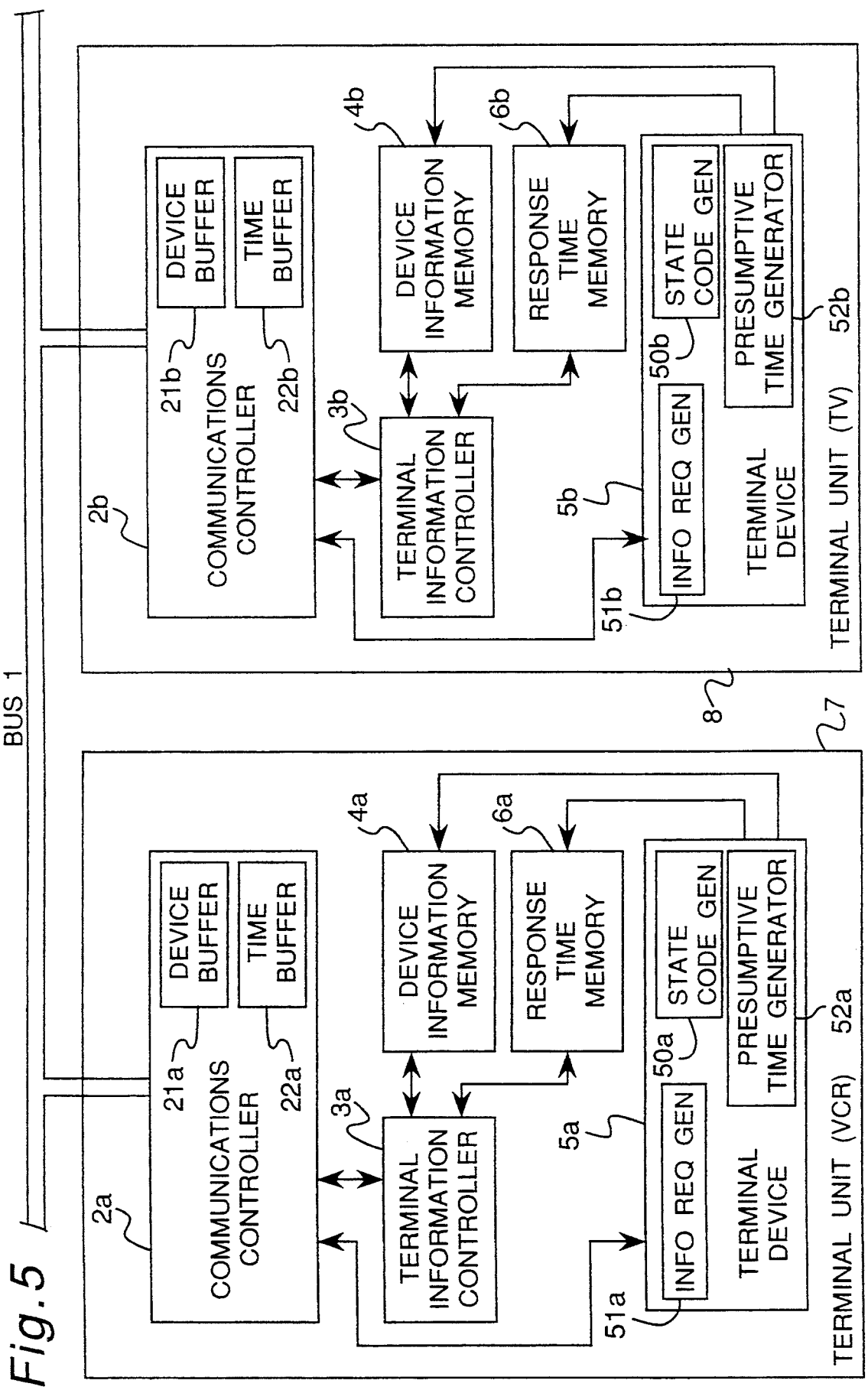
FIG. 5 is a block diagram of a state information communications system according to a second embodiment of the present invention.

Referring to FIG. 5, a state information communications system according to the second embodiment of the present invention is shown. When compared with the first embodiment, the second embodiment further has, in the terminal unit 7, a time buffer 22a in the communications controller 2a, a response time memory 6a, and a presumptive time generator 52a in the terminal device 5a. The same elements are added in the terminal unit 8.

In operation, it is assumed that the terminal unit 8 has produced a control command of PLAY to terminal unit 7, and the PLAY control command is applied to the terminal information controller 3a and also to the terminal device 5a in the same manner described above in the first embodiment.

In response to the receipt of the PLAY control command, the terminal information controller 3a permits access to a particular area (at address 20C4) in both memories 4a and 6a. Also, in response to the receipt of the PLAY control command, terminal device 5a operates the tape deck of the VCR, which has been in the STOP state, to change to the PLAY state. Also, the state code generator 50a produces a transient code h"FF" which is stored at address 20C4 in the device information memory 4a, and at the same time, the presumptive time generator 52a produces a time code, generally indicated as h"TIME". For example, when the PLAY control command is received, the maximum time necessary to change from the STOP state to PLAY state, e.g., 3 seconds (3000 ms) is produced from the presumptive time generator 52a. Thus, h"BB8" expressed in hexadecimal number system and corresponding to 3000 as produced from the presumptive time generator 52a is stored in response time memory 6a.

Table 2 given below shows the address and the data stored in the device information memory 4a.

TABLE 2

| General | 00 A1 h"000" | 00 A1 h"000" | 00 A2 h"000" | 00 A3 h"000" | 00 A4 h"000" |
|---|---|---|---|---|---|
| Deck state | Vacant | 20 C1 h"000" | 20 C2 h"000" | 20 C3 h"000" | 20 C4 h"BB8" |
| Tuner state | Vacant | 28 C1 h"000" | 28 C2 h"000" | Vacant | Vacant |

As shown in Table 2, the addresses for the various devices and various events are the same as those shown in Table 1. Although in FIG. 5 two memories 4a and 6a are shown, one chip memory can be used to store the data to be stored in memories 4a and 6b.

The time code stored in the response time memory 6a is supplied from the presumptive time generator 52a, and is renewed to a shorter time code each time the device makes a particular movement.

Then, after the lapse of a waiting time Tw (e.g., 400 ms) from the generation of the PLAY control command, the information request generator 51b in terminal device 5b produces an information request code designating an addressing 20C4 in the VCR terminal unit 7. The information request code is transmitted through the communications controller 2b and bus 1 to terminal information controller 3a. In response to the received information request code, controller 3a fetches a code stored at address 20C4 in memory 4a and also in memory 6a. Currently, a transient code h"FF" is stored in memory 4a and a time code h"BB8" is stored in memory 6a. The fetched codes h"FF" and h"BB8" from address 20C4 in memories 4a and 6a are transmitted to the device buffer 21a and time buffer 22a, respectively, in the communications controller 2a.

Then, the communications controller 2a sends out the transient code h"FF" and the time code h"BB8" through bus 1 to communications controller 2b and further to the terminal device 5b. In the terminal device 5b, the information request generator 51b sets, in response to the received time code h"BB8", the waiting time based on time code h"BB8", such as (3000 ms minus the time so far spent from the generation of the PLAY control command) for generating the next information request code, so that the next information request code will be produced after the set time from the previous information request code.

In this manner, the data traffic in the bus 1 can be reduced.

FIGS. 6a, 6b and 6c show flow charts of operations in the terminal information controller 3, terminal device 5 and communications controller 2, respectively, of the second embodiment and FIG. 7 shows a timing chart of the elements 2, 3, 4 and 5.

FIG. 6c is the same as FIG. 3c and therefore the description is omitted.

Referring to FIGS. 6b and 7, when compared with the first embodiment, step S12 is different and step S15 is further added. At step S12, in terminal device 5a, both codes h"FF" and h"TIME" are written in memories 4a and 6a, respectively. At step S15, the time code h"TIME" is renewed after every particular movement of the device in the terminal device 5a. One particular movement in the PLAY command would be a tape pulling out movement for pulling out a tape portion from a cassette.

Referring to FIGS. 6a and 7, when compared with the first embodiment, steps S3, S4 and S5 are different. At step S3, it is detected whether or not the read information code is h"FF" or not. If yes, the program goes to step S4 to read and move both codes h"FF" and h"TIME" respectively, from memories 4a and 6a to buffers 21a and 22a. If not, the program goes to step S5 to read and move only the information code h"FF" from memory 4a to buffer 21a.

If the reply data send back to the terminal unit 8 includes the time code h"TIME", the information request generator 51b in terminal unit 8 generates the generates the next information request code after a waiting time calculated from h"TIME". Thus, less number of information request code will be transmitted along bus 1.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A state information communications method for sending data from a first terminal unit to a second terminal unit and vice versa, said method comprising the steps of:
   (a) sending a control command from said first terminal unit to said second terminal unit for controlling a device provided in said second terminal unit;
   (b) producing a transient state code when said device is in a transient state changing from one fixed state to another fixed state;
   (c) sending an information request command, after a first predetermined time from the sending of said control command, from said first terminal unit to said second terminal unit for requesting the present state of said device;
   (d) replying to said information request command by sending said transient state code from said second terminal unit to said first terminal unit;
   (e) generating, in response to said control command, a time information indicative of a time length necessary to change from one fixed state to another fixed state; and
   (f) resending said information request command after said time length determined by said time information when said second terminal unit produces said transient state code in reply to the first one of said information request command.

2. A state information communications system comprising:
   a bus means;
   a first terminal unit connected to said bus means, said first terminal unit comprising:
      control command generating means for generating a control command;
      information request command generating means for generating an information request command;
      first communications control means for sending said control command and said information request command to said bus means, and for receiving information data directed to said first terminal unit through said bus means;
   a second terminal unit connected to said bus means, said second terminal unit comprising:
      second communications control means for receiving said control command and said information request command from said bus means;
      terminal device means having an electrically operating device which operates in response to said control command;
      state code generating means for generating a fixed state code when said device is in a fixed state and a transient state code when said device is in a transient state changing from one fixed stated to another fixed state;
      first memory means for storing said state code produced from said state code generating means;
      a presumptive time generator for generating a presumptive time information indicative of a time length necessary to change from one fixed state to another fixed state;
      second memory means for storing said generated presumptive time information;
      information control means, operative in response to said information request command, for fetching said state code stored in said first memory means and said presumptive time information stored in said second memory means; and
      said second communications control means, operative in response to said information request command, for sending the fetched state code and the presumptive time information through said bus means to said first terminal unit;
      said first terminal unit further for resending said information request command after a predetermined time determined by said presumptive time information when said second terminal unit produces said transient state code in reply to the first one of said information request command.

3. A state information communications system as claimed in claim 2, wherein said first terminal unit is a television receiver set and said second terminal unit is a video cassette recorder.

4. A state information communications system as claimed in claim 3, wherein said electrically operating device is a tape deck.

5. A state information communications system as claimed in claim 2, wherein said first memory means stores various state codes at various addresses, and wherein said information request command as produced from said information request command generating means accompany address data of said first memory means.

6. A state information communications system as claimed in claim 2, wherein said information request command generating means generates said information request command after a first predetermined time from the generation of said control command and said next information request command after a second predetermined time determined by said presumptive time information when said second terminal unit produces said transient state code in reply to one of said information request command.

7. A state information communications system as claimed in claim 2, wherein said first terminal unit further has all the elements provided in said second terminal unit, and said second terminal unit further has all the elements provided in said first terminal unit.

* * * * *